United States Patent [19]

Le Fur et al.

[11] 4,142,971

[45] Mar. 6, 1979

[54] PROCESS AND SYSTEM FOR THE DEHYDRATION OF RESIDUES

[75] Inventors: Jean Le Fur, Garches; René Haas, Chambourcy, both of France

[73] Assignee: Degremont, Rueil Malmiason, France

[21] Appl. No.: 800,550

[22] Filed: May 25, 1977

[30] Foreign Application Priority Data

Jun. 11, 1976 [FR] France ............................ 76 17718

[51] Int. Cl.² .................. B01D 33/04; B01D 37/00
[52] U.S. Cl. ................................. 210/77; 210/86; 210/386; 210/400
[58] Field of Search .............. 210/77, 86, 386, 400; 162/348, 351; 100/118, 120, 151-154

[56] References Cited

U.S. PATENT DOCUMENTS

| 3,446,139 | 5/1969 | Coffelt | 100/118 |
| 3,601,039 | 8/1971 | Schover | 210/386 X |
| 3,743,100 | 7/1973 | Bähr | 210/386 |
| 3,896,030 | 7/1975 | Bähr | 210/386 X |
| 3,984,329 | 10/1976 | Wenzel et al. | 210/400 X |

*Primary Examiner*—William A. Cuchlinski, Jr.
*Attorney, Agent, or Firm*—Wenderoth, Lind & Ponack

[57] ABSTRACT

A system for the dehydration of residues such as sludge includes first and second endless filter belts which move at identical speeds in endless paths. A residue to be dehydrated is supplied between the two filter belts which pass together in alteration around a perforated drum and a plurality of rollers. Two of the rollers are positively driven at identical speeds but in opposite directions to thereby drive the two filter belts at identical speeds. Both filter belts are simultaneously and identically tensioned to control the pressure exerted by the filter belts on the residue during passage thereof around the drum and rollers. A supplemental pressing assembly presses the filter belts and residue against the perforated drum at a uniform pressure regardless of the thickness of the residue. The supplemental pressing assembly is simultaneously controlled by the same fluid source which controls the assemblies which tension both of the filter belts.

27 Claims, 6 Drawing Figures

PROCESS AND SYSTEM FOR THE DEHYDRATION OF RESIDUES

BACKGROUND OF THE INVENTION

The present invention relates to a process and system to dehydrate sludge or other residues such as pulpy residues.

There are presently known numerous dehydration devices wherein a residue is passed between two endless belts which press against the residue and thereby extract water from the residue. However, in operating such devices it is necessary to attempt to control the tension of the belts, both to control the thickness of the residue filter cake formed, and to account for tension variations in the material forming the belts. Past attempts to control belt tension have involved mechanical devices, such as adjustable screw settings or springs. However, such devices have the inherent disadvantages of partially stretching the belts when the residue filter cake is not yet formed. Other prior art attempts to control the movement and tension of the belts have involved the use of gear wheel drives. However, such drive systems are inherently expensive and are additionally difficult to protect against corrosion from the residue.

SUMMARY OF THE INVENTION

With the above discussion in mind, it is the primary object of the present invention to provide a process and system for dehydrating residues, such as sludge or pulpy residues, wherein the above prior art disadvantages are overcome.

It is a specific object of the present invention to provide a residue dehydration process and system employing a pair of endless filtering means wherein the tension of the filtering means is uniformly and precisely controllable, thereby controlling the thickness of the residue filter cake formed.

It is a further object of the present invention to provide such a residue dehydration system which is simpler in operation and less expensive in cost than previously known systems.

The above objects are achieved in accordance with the present invention by providing a pair of endless filter means, such as porous filter belts, between which a residue to be dehydrated is fed. The filter belts with the residue therebetween are alternately passed over portions of the peripheries of a plurality of cylindrical members, preferably a perforated drum and a plurality of rollers. Two of the rollers are positively driven at equal speeds but at opposite directions to thereby drive the two filter belts at identical speeds.

The tension of each of the filter belts is simultaneously controlled by a separate tensioning assembly. The tensioning assemblies of both belts are simultaneously and equally controlled and operated such that the tension of both belts are equal. In a preferred embodiment of the invention, both belt tensioning assemblies are fluid controlled by a single fluid source. Thus, it is possible to ensure that both belts are equally tensioned, and it is possible to control the pressure exerted by the belts on the residue, and thus the thickness of the residue filter cake. The belt tensioning assemblies are preferably constructed in a manner to enable relative widthwise tensioning of each belt, to compensate for varying degrees of elasticity of the material forming each belt.

In accordance with a further preferred feature of the present invention, a supplemental pressing assembly operates to apply additional pressure to the residue filter cake during its passage around the perforated drum. The supplemental pressing assembly is preferably fluid operated and is supplied by the same single fluid source which controls the belt tensioning assemblies. Thereby, the supplemental pressing assembly presses against the filter belts and residue filter cake at a uniform pressure, regardless of the thickness of the residue filter cake.

BRIEF DESCRIPTION OF THE DRAWINGS

Other objects, features and advantages of the present invention will be apparent from the following detailed description of a preferred embodiment thereof, with reference to the attached drawings, wherein.

DETAILED DESCRIPTION OF THE INVENTION

Figure 1:
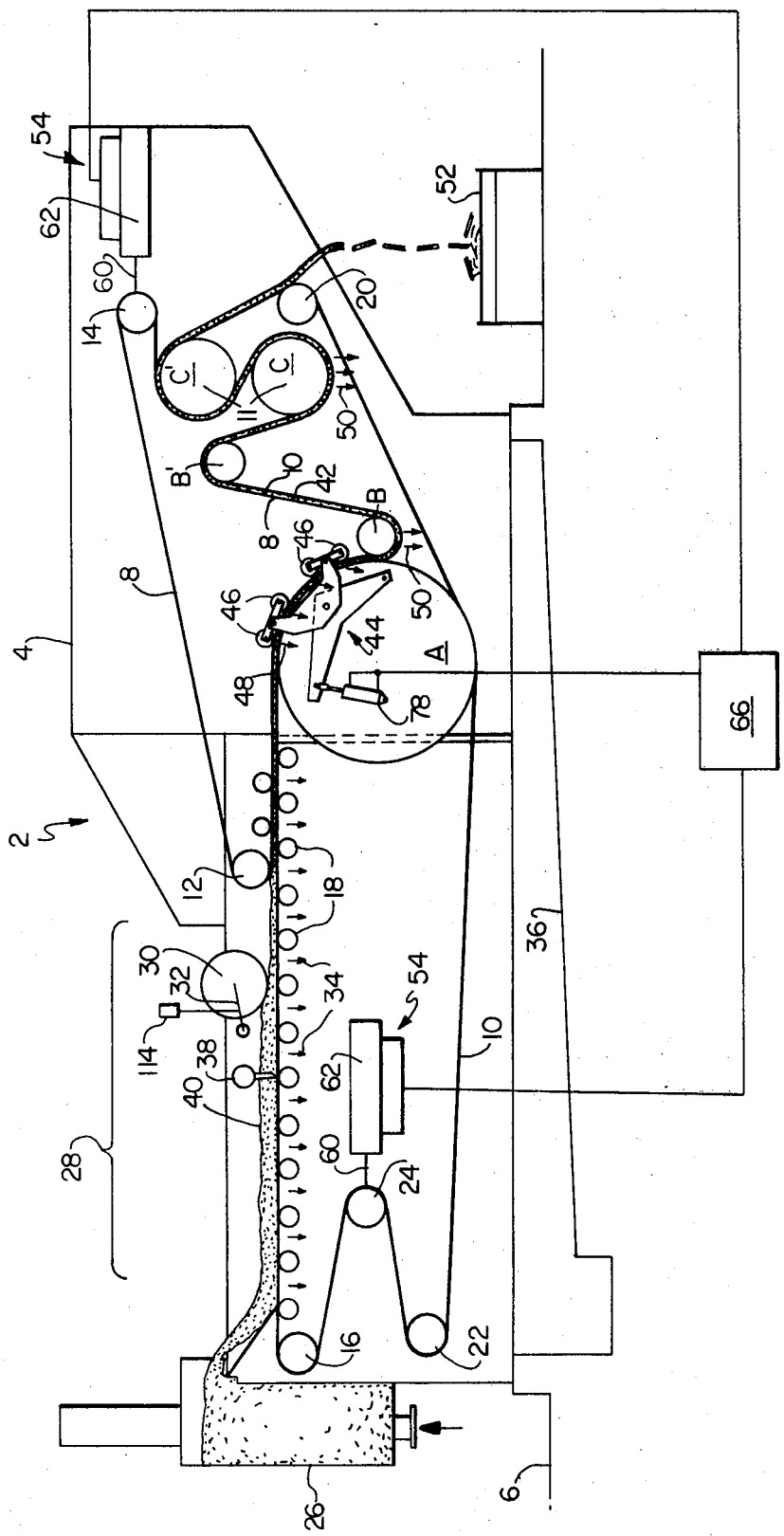
FIG. 1 is a schematic elevational view of the dehydration system of the present invention.

It is to be understood that various of the dimensions of certain of the elements shown in the drawings have been distorted for purposes of clarity of illustration.

With reference now to FIG. 1 of the drawings, the dehydration system 2 is particularly employable for the dehydration of sludge, and therefore the following description will be made with reference thereto. However, it is to be understood that the system of the present invention could be employed for the dehydration of other residues, such as pulpy residues.

The dehydration system 2 generally includes a frame assembly 4 which is mounted on a foundation 6. The frame assembly itself forms no portion of the present invention, and therefore is shown schematically only. It will however be understood to those skilled in the art that frame assembly 4 supports the various elements of the present invention by conventional means.

Upper and lower filtering devices 8 and 10, such as for example conventional porous filtering belts, are supported for continuous and endless movement by frame assembly 4. Specifically, upper filtering belt 8 moves through an endless path as shown around lead in roller 12, perforated filtering drum A, rollers B, B', C and C', forming an advanced dehydration zone to be discussed in more detail below, and tensioning roller 14. Lower filtering belt 10 passes in an endless path around lead in roller 16, support rollers 18, perforated drum A, rollers B, B', C and C', discharge roller 20, return roller 22, and tensioning roller 24. With certain exceptions to be discussed in more detail below, all of the above rollers are support by frame assembly 4 in a known manner. Further, with the exception of rollers C and C' to be discussed in more detail below, all of the above mentioned rollers are idler rollers. Furthermore, it will be understood that the system could include additional rollers and other elements such as belt centering devices, washing devices, cleaning scrapers, etc., which are known in the art and do not form a portion of the present invention, and which are thus not further illustrated or described.

Sludge is supplied, for example from a flocculation chamber 26, to an upper substantially horizontal run of lower filtering belt 10 supported by rollers 18. This substantially horizontal run forms a preliminary sludge spreading zone 28 including at least one roller 30 freely supported, for example by articulated arm 32 mounted on frame assembly 4 to press by the weight of roller 30 against the sludge and to spread the sludge across the width of belt 10. In the embodiment illustrated in FIG. 1 of the drawings, one roller 30 is shown. However, it is to be understood that in accordance with the present invention more than one roller 30 could be provided. There is also provided, at a position upstream of roller 30, a harrow device 38 having vertical or inclined fingers or projections which extend downwardly to slightly contact filter belt 10 and trace furrows in the sludge. The provision of harrow device 38 operates to facilitate spreading of sludge 40 and to facilitate evacuation therefrom of the water. It is to be understood that if more than one roller 30 were to be provided, then a corresponding number of harrow devices 38 each positioned upstream of a respective roller 30 could be provided. As indicated by arrows 34, some water or liquid residue from the sludge 40 passes through porous filtering belt 10 and is collected by trough 36 beneath the system.

The thus spread and preliminarily dehydrated sludge is passed between upper and lower filter belts 8 and 10 and is pressed therebetween while passing around a portion of the periphery of perforated filtering drum A. During passage around drum A, the upper filter belt 8 presses the sludge radially inwardly with respect to drum A, thereby pressing further water from the sludge and forming a sludge filter cake 42. A supplemental pressing assembly 44, to be discussed in more detail below, includes rollers 46 which operate to further facilitate dehydration of the filter cake 42 by pressing against upper filter belt 8 and thus the filter cake at a uniform pressure regardless of the thickness of the filter cake. Perforated drum A and supplemental pressing assembly 44 form a light dehydration zone, and water pressed from the filter cake at this zone passes through porous lower filter belt 10, thereby acting as a filter, and through perforated drum A, as shown by arrows 48, to be collected in trought 36.

Figure 2:
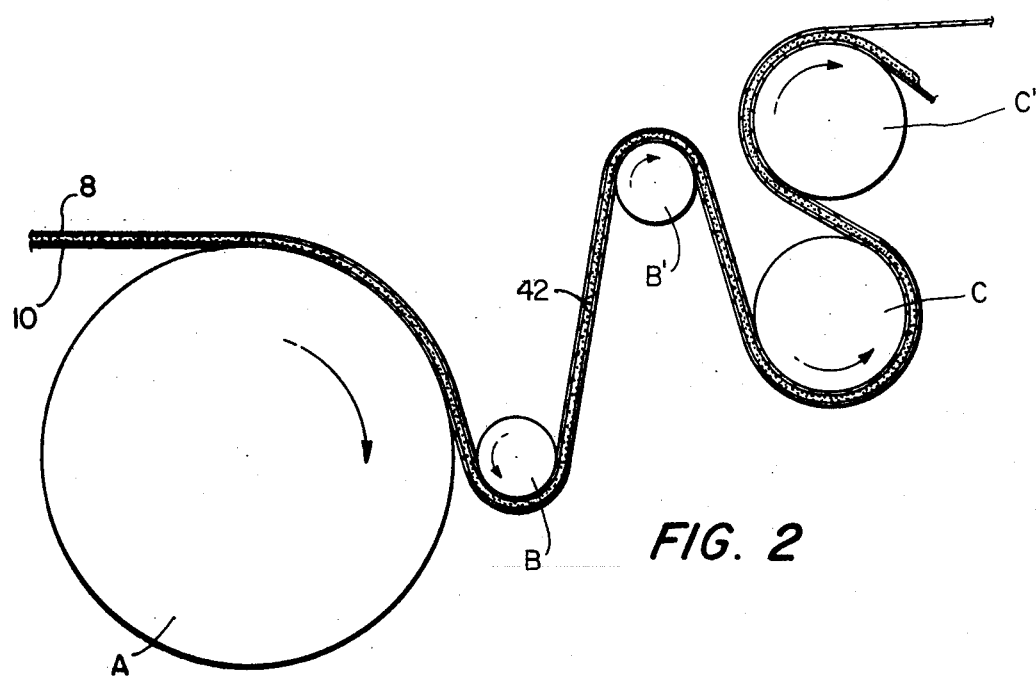
FIG. 2 is an isolated schematic view of a portion of the system of FIG. 1, particularly showing the movement of various of the elements forming light and advanced dehydration zones thereof.

The filter cake is then advanced by filter belts 8 and 10 through an advanced dehydration zone formed by rollers B, B', C and C'. As shown in FIG. 2, the filter cake and belts 8 and 10 are alternately bent around rollers B, B', C and C' which accordingly rotate in alternate directions. This facilitates breaking up of the filter cake and facilitates drainage of water pressed therefrom. The water pressed from the filter cake during passage thereof through the advanced dehydration zone occurs at the lowermost portions of rollers B and C, as shown by arrows 50, and this water is collected in trough 36. The dehydrated sludge is discharged at a suitable position 52.

The pressure of the filter belts pressing against the sludge cake may be adjusted by adjusting the tension of the filter belts 8 and 10. Specifically, the tension of each filter belt 8 and 10 is controlled and is adjustable by an identical belt tensioning assembly 54. The tensioning assembly for upper filter belt 8 operates on tensioning roller 14, and the tensioning assembly of the lower filter belt 10 operates on tensioning roller 24.

Figure 3:
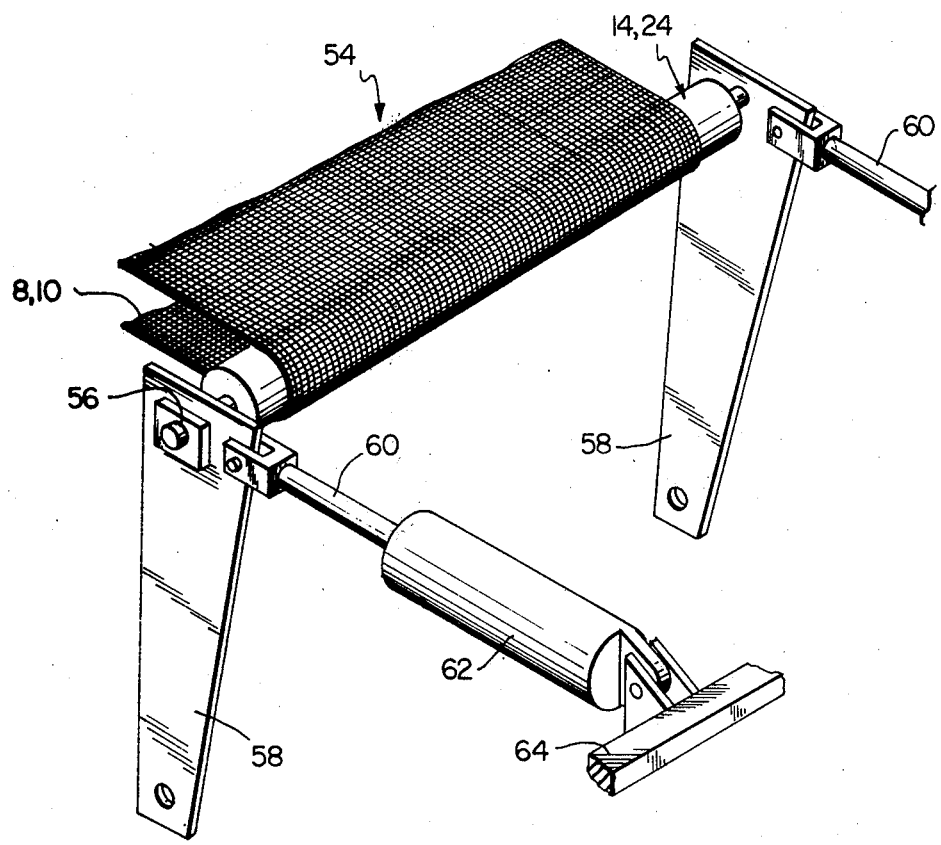
FIG. 3 is an enlarged perspective view of a filter belt tensioning assembly employed in the system of FIG. 1.

With specific reference to FIG. 3 of the drawings, the belt tensioning assemblies 54 will be described in more detail. It is specifically to be understood that the two assemblies 54 for belts 8 and 10 are identical. In accordance with a specifically preferred embodiment of the present invention, both tensioning assemblies 54 are operated by a single pressure source, so that upper and lower belts 8 and 10 are equally and identically tensioned. Specifically, each tensioning roller 14 and 24 is supported at opposite ends thereof, for example by bearings 56, in first ends of a pair of articulated arms 58, the opposite ends of which are pivotally mounted to frame assembly 4. Each articulated arm 58 has attached thereto the rod 60 of a piston-cylinder assembly 62, the cylinder of which is mounted on frame assembly 4 as at 64. In the preferred embodiment of the present invention both cylinders 62 of each tensioning assembly 54 are directly supplied by equal fluid pressure from a single pressure source, as shown schematically in FIG. 1 at 66. The pressure source may be pneumatic or hydraulic. The supply of fluid to the piston-cylinder units 62 will cause articulated arms 58 to be pivoted in a clockwise or counterclockwise direction as shown in FIG. 3, thereby more or less tensioning belts 8 and 10. By supplying all piston-cylinder units 62 from a single fluid pressure source 66, it is possible to ensure that each of belts 8 and 10 will be regularly tensioned across the width thereof and further that both of belts 8 and 10 will be identically tensioned. It is however to be understood that the tensioning assemblies may include known fluid pressure adjusting devices to individually adjust the relative positions of rods 60, to thereby ensure individual positional displacements thereof to compensate for varying elasticity of either of the belts across the width thereof.

In the above described specific arrangement, the belt tensioning assemblies 54 are operated by fluid pressure. It is however to be understood that the present invention is not limited to the use of fluid pressure operated tensioning systems. Rather, the concept of the present invention may include the use of other pressure applying means, the specifically preferred embodiment of the present invention however providing that controlled equal or constant ratio pressures be applied to both filter belts 8 and 10.

It will be apparent that the tension applied to belts 8 and 10 by respective tensioning assemblies 54 will regulate the degree of pressing of the filter cake by the belts during the passage thereof around drum A and rollers B, B', C and C'. It will further be apparent that upper filter belt 8 operates as the pressing belt around drum A and around rollers B' and C', and that lower filter belt 10 operates as the pressing belt around rollers B and C.

Figure 4:
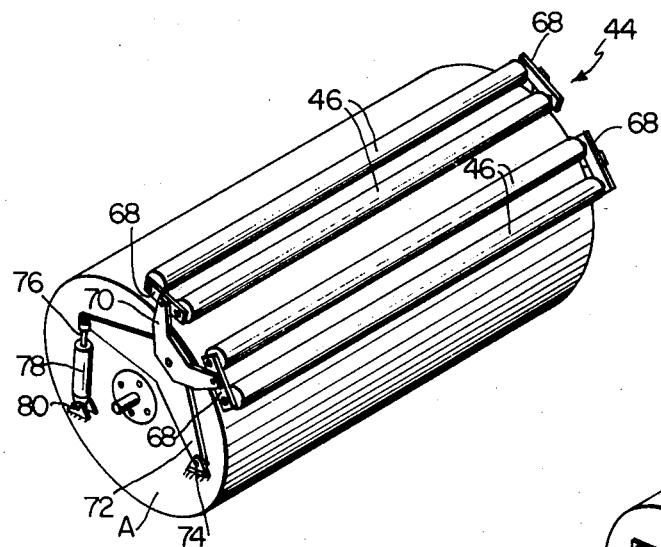
FIG. 4 is an enlarged perspective view of a supplemental pressing assembly used in the system of FIG. 1.

The light dehydration zone includes, as mentioned above, the supplemental pressing assembly 44, which is shown in more detail in FIG. 4 of the drawings.

Figure 5:
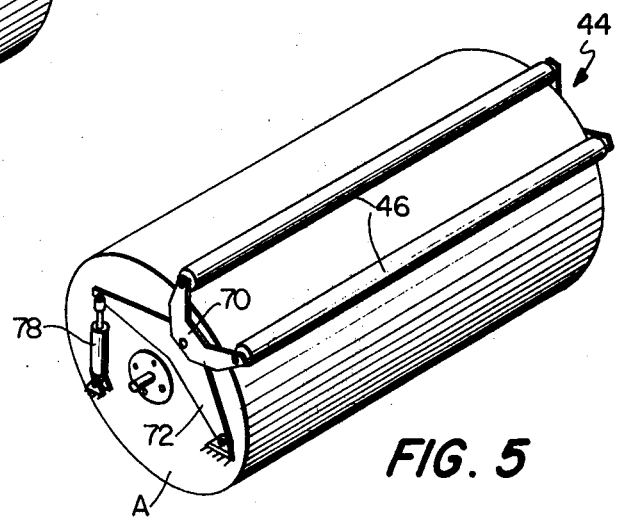
FIG. 5 is a view similar to FIG. 4 but showing a modification of the supplemental pressing assembly.

Specifically, the supplemental pressing assembly 44 includes a plurality of rollers 46. In the embodiment shown in FIGS. 1 and 4 of the drawings there are four such rollers arranged in two groups of two. It is to be understood however that the supplemental pressing assembly may include only two rollers 46, as shown in the embodiment of FIG. 5. Furthermore, it will be apparent to those skilled in the art that the supplemental pressing assembly could include a number of rollers 46 greater than four.

In the embodiment of FIG. 4 each pair of rollers 46 are rotatably mounted at opposite ends thereof to brackets 68. The brackets 68 are in turn pivotally mounted, adjacent the center portions thereof, to opposite ends of somewhat U-shaped link members 70. Each link member 70 is pivotally attached, adjacent the center portion thereof, to a midportion of an articulated arm 72. One end of each articulated arm 72 is pivotally mounted as at 74 to frame assembly 4. The opposite end of each articulated arm 72 is attached to the rod 76 of a piston-cylinder assembly 78, the cylinder of which is attached, for example as at 80, to frame assembly 4.

In FIGS. 4 and 5 of the drawings, only one link member 70, one articulated arm 72, and one piston-cylinder assembly 78 are shown. However, it is to be understood that a similar assembly is provided on the opposite, non-illustrated side of perforated drum A.

It will be apparent, that as piston-cylinder assembly 78 is operated such that rod 76 moves inwardly thereof, i.e. downwardly in the direction of FIGS. 1, 4 and 5, articulated arms 72 will be pivoted about 74. This will cause a similar movement about pivot 74 of link members 70, bracket 68, and rollers 46. Due to the pivotal connection between each link member 70 and the respective articulated arm 72, and between each end of the link member 70 and the respective bracket 68, upon pivoting movement in a counterclockwise direction about 74 of articulated arms 72, all of the rollers 46 will be allowed to adapt to the surface with which they contact, i.e. the upper filter belt 8. In this regard, for purposes of clarity of illustration, filter belts 8 and 10 and sludge filter cake 42 are not shown in FIGS. 4 and 5 of the drawings.

In accordance with a specifically preferred embodiment of the present invention, each of the piston-cylinder assemblies 78 are operated by pressure source 66, i.e. the same pressure source which operates tensioning assemblies 54. This is shown schematically in FIG. 1. In other words, the same pressure which is supplied to piston-cylinder assemblies 62 of the belt tensioning assemblies 54 is also applied to piston-cylinder assemblies 78 of the supplemental pressing assembly 44. This provides the unique advantage that rollers 46 will be caused to exert a uniform supplemental pressing operation, regardless of the thickness of the sludge filter cake 42.

More specifically, if the pressure supplied to piston-cylinder assemblies 62 of the belt tensioning assemblies 54 is increased in a manner to cause further tensioning of filter belts 8 and 10, then the pressing effect of belts 8 and 10 on the sludge will be increased, such that the sludge filter cake 42 passing around perforated drum A will be relatively less thick. However, at the same time, due to the fact that the piston-cylinder assemblies 78 of the supplemental pressing assembly 44 are simultaneously operated by the same pressure source 66, articulated arms 72 will be pivoted about their respective pivots 74, in the counterclockwise direction as shown in FIGS. 1, 4 and 5, thereby moving rollers 46 closer to perforated drum A, and thereby maintaining a uniform pressure against upper filter belt 8 and sludge filter cake 42, even though sludge filter cake 42 has been made less thin due to increased tensioning of the filter belts. It will of course be apparent that upon operation of the belt tensioning assemblies 54 to lessen the tension of filter belts 8 and 10, and to thereby provide for a relatively thicker sludge filter cake, articulated arms 72 will be moved in a clockwise direction, thereby moving rollers 46 relatively further away from perforated drum A, but still maintaining a uniform pressing action against upper filter belt 8 and sludge filter cake 42.

As mentioned above, drum A is an idler drum, and all of the rollers of the system, with the exception of rollers C and C', are idler rollers. Rollers C and C' are driven rollers which are preferably driven at the same speed to drive filter belts 8 and 10 at identical longitudinal velocities. It will be apparent that it is necessary for rollers C and C' to be rotated in opposite directions with respect to each other. It will further be apparent to those skilled in the art that various known drive systems may be employed to rotate rollers C and C' at the same speeds but in opposite directions.

Figure 6:
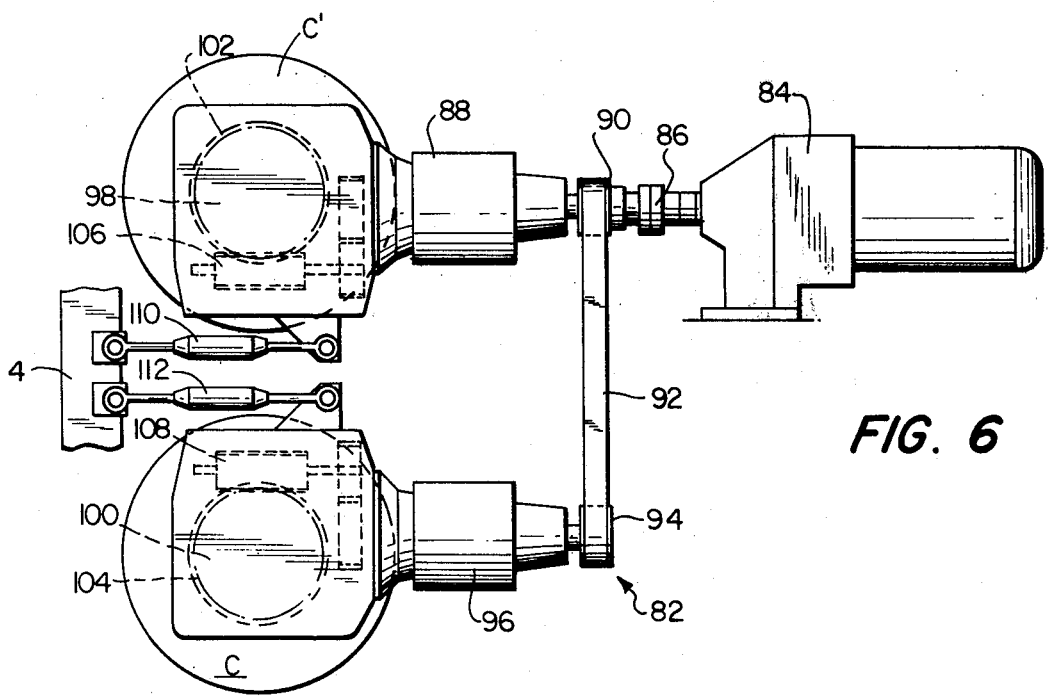
FIG. 6 is an enlarged partially schematic view of the filter belt drive assembly used in the system of FIG. 1.

However, a preferred drive assembly for rotating rollers C and C' at the same speed but in opposite directions is shown in FIG. 6 of the drawings. The drive mechanism is not included in schematic FIG. 1, for purposes of clarity of illustration.

The drive assembly 82 includes a motor 84 which may be a variable speed motor, the outlet shaft of which drives, possibly via a coupling 86, such as a clutch, an inlet shaft of a first reduction gear assembly 88, such shaft having fixed thereto a first pulley 90. Rotation of pulley 90 is transferred via belt 92 to a second pulley 94 which is fixed to the input shaft of a second reduction gear assembly 96. Rollers C' and C are respectively supported by shafts 98 and 100, for example hollow shafts, each of which has on a portion of the outer periphery thereof suitable gear teeth 102 and 104, respectively. The rotation of the input shafts of reduction gear assemblies 88 and 96 are transmitted to worm gears 106 and 108, respectively, which mesh with gear teeth 102 and 104, respectively. Thus, the rotation of the input shafts of the reduction gear assemblies 88 and 96, due to pulleys 90 and 94, belt 92, clutch 86 and motor 84, are transferred via meshed gearing 106, 102 and 108, 104 to shafts 98 and 100, respectively, and thus to rollers C' and C, respectively.

The various gearing associated with rollers C' and C are of equal dimensions, and pulleys 90 and 94 are of equal dimensions, to thereby ensure that rollers C' and C are rotated at equal speeds.

To ensure that rollers C' and C rotate in opposite directions relative to each other, the worm gears 106 and 108 engage respective gears 102 and 104 at diametrically opposite positions thereof. In the embodiment illustrated in FIG. 6, worm gear 106 meshes with gear teeth 102 at the bottom of shaft 98, and worm gear 108 engages with gear teeth 104 at the top of shaft 100. However, it will be apparent to those skilled in the art that other specific meshing positions are possible to achieve opposite direction rotation of rollers C' and C. For example, worm gear 106 could engage gear teeth 102 at the top portion of shaft 98, and worm gear 108 could engage gear teeth 104 at the bottom portion of shaft 100, to thereby also achieve rotation of rollers C' and C in opposite relative directions.

In a further possible feature of the present invention, reduction gear assemblies 88 and 96 may be of the floating type, and meshing engagement between worm gear 106 and gear teeth 102 and between worm gear 108 and gear teeth 104 may be achieved by adjustable length biasing members 110 and 112, respectively, which may both be mounted on frame assembly 4.

It will be apparent to those skilled in the art that if it should be desired that filter belts 8 and 10 move at different longitudinal speeds, for example to obtain a shearing of the sludge filter cake, then such could readily be achieved by providing pulleys 90 and 94 of different size, or alternatively by changing the gear ratios of selected elements of the reduction gearing assemblies 88 and 96.

In accordance with a further feature of the present invention, it is possible to automatically stop and start drive motor 84, and thereby belts 8 and 10, dependent upon the absence or presence of sludge at the horizontal preliminary spreading zone 28. Specifically, a position detection device, for example a limit switch 114 shown schematically in FIG. 1, could be positioned to be responsive to the position of the articulated link 32 associated with the roller 30. As long as sludge is present on the upper horizontal run of filter belt 10, roller 30 will have a relatively elevated position, and the corresponding position of respective link 32 would be detected by limit switch 114. However, in the event that the supply of sludge to the upper horizontal run of belt 10 would be terminated, then the position of roller 30 and link 32 would be correspondingly lowered, thereby causing limit switch 114 to detect such position lowering. Limit switch 114 could be connected to the circuit operating drive motor 84, to stop motor 84 in the event of detection by limit switch 114 of a lowered position of link 32 indicative of the lack of sludge.

It will be particularly apparent from a consideration of FIGS. 1 and 2 of the drawings that as belts 8 and 10 pass in curved paths around drum A and rollers B, B', C and C', the exterior belt at each such position will be caused to pass through a longer path than the interior belt. Accordingly, it is preferable in accordance with the present invention that the paths of belts 8 and 10 be designed such that each belt has a total angular path around all of drum A and rollers B, B', C and C' equal to the total angular path of the other belt. With specific reference to FIG. 2 of the drawings, it will be apparent that belt 8 will travel a greater distance than belt 10 during passage around drum A and roller B'. It will further be apparent from FIG. 2 of the drawings that belt 10 will travel a greater distance than belt 8 during passage around rollers B and C. If rollers B and B' are of equal diameter, then the above differences with respect to rollers B and B' will cancel each other out. However, since drum A has a greater diameter than roller C, belt 10 is maintained in contact with roller C' longer than is belt 8, to compensate for such difference. Thereby, it is possible to achieve relative slippage between the belts, and to maintain the two belts at identical speeds.

It will of course be apparent that the respective surfaces of belts 8 and 10 and drive rollers C and C' are of satisfactory configuration and/or materials so that sufficient friction is provided to achieve driving contact therebetween.

As mentioned above, by passing the belts and sludge filter cake in the alternating manner illustrated around the drum A and rollers B, B', C and C', the sludge filter cake is broken, and pressing is alternately achieved by belts 8 and 10. However, the present invention is not limited to the specific use of the number of rollers shown. Rather, the concept of the present invention is achievable with a fewer or greater number of rollers. It will further be apparent that the concept of the present invention is not limited to the specific relative sizes of rollers B, B', C and C' illustrated. Rollers C and C' of course must be of a size to achieve efficient driving contact with belts 8 and 10. In one specific embodiment of the present invention, it has been found advantageous if the diameter of drum A is approximately five times the diameter of rollers B and B' and approximately two times the diameter of rollers C and C'. It is specifically to be understood however that the concept of th present invention is in no way limited to such specific relative diameters.

It will be apparent that various modifications may be made to the specifically above described and illustrated structural arrangements without departing from the scope of the present invention. It is specifically to be understood that the concept of the present invention is not intended to be limited to the specific type of sludge supply apparatus illustrated, to the specific type of drive assembly for rollers C and C', to the specific construction of filter means 8 and 10, and to the specific construction of drum A and rollers B, B', C and C'.

What is claimed is:

1. A system for the dehydration of residues such as sludge or pulpy residues, said system comprising:

first and second endless filter means between which is fed a residue to be dehydrated, each said filter means being mounted for movement about a respective endless path;

a plurality of cylindrical members mounted to support both said first and second filter means over portions of the respective endless paths thereof;

said first and second filter means, with said residue therebetween, passing alternately over portions of the peripheries of said cylindrical members, thereby pressing and dehydrating said residue;

means for driving first and second adjacent of said cylindrical members at the same speed but in opposite directions, and for thereby driving said first and second filter means;

means for simultaneously and uniformly tensioning said first and second filter means, said tensioning means comprising a separate fluid operated tensioning assembly for each said filter means, and a single fluid source operatively connected to both said tensioning assemblies to simultaneously and equally control the operation thereof, each said tensioning assembly comprising a tensioning roller over which passes the respective filter means, a pair of first articulated arms supporting opposite ends of said tensioning roller, and a pair of first fluid operated piston-cylinder assemblies, one each connected to one of said arms, both of said first piston-cylinder assemblies of each of said tensioning assemblies being operatively connected to said single fluid source to be simultaneously operated thereby; and supplemental pressing means for pressing said filter means and said residue against a first of said cylindrical members at a uniform pressure regardless of the thickness of said residue between said first and second filter means, said supplemental pressing means comprising a plurality of pressing rollers supported by mounts about the periphery of said first cylindrical member, and fluid operated means for positioning said pressing rollers at a controlled position from said first cylindrical member, said mounts comprising a pair of links, each supporting opposite ends of said rollers, and a pair of second articulated arms, one each pivotally attached to a respective of said links, said fluid operated means comprising a pair of second piston-cylinder assemblies, both connected to said single fluid source and one each connected to a respective said second articulated arm.

2. A system as claimed in claim 1, wherein said first and second filter means each comprise an endless porous filter belt.

3. A system as claimed in claim 1, wherein said first cylindrical member comprises a perforated drum.

4. A system as claimed in claim 1, wherein said fluid operated means are operated by said single fluid source such that said controlled position of said pressing rollers is variable as a function of the tension exerted on said filter means by said tensioning assemblies.

5. A system as claimed in claim 1, comprising two said pressing rollers, and wherein each said link comprises a substantially U-shaped member supporting at opposite ends thereof one of said pressing rollers.

6. A system as claimed in claim 1, comprising four said pressing rollers, and wherein each said link comprises a substantially U-shaped member pivotally supporting at opposite ends thereof a pair of brackets, each said bracket supporting adjacent ends of two of said pressing rollers.

7. A system as claimed in claim 1, wherein said first and second adjacent cylindrical members are of equal diameter.

8. A system as claimed in claim 1, wherein said driving means comprises a drive motor, and first and second gear assemblies driven by said drive motor and respectively coupled to said first and second adjacent cylindrical members.

9. A system as claimed in claim 1, wherein said endless path of said first filter means includes a substantially horizontal run onto which is supplied said residue, and further comprising at least one roller means, hingedly mounted to press against said residue on said horizontal run by the weight of said roller means alone, for spreading said residue across the width of said horizontal run.

10. A system as claimed in claim 9, further comprising detection means, operatively connected to said roller means and said driving means, for detecting the termination of supply of residue to said horizontal run and for deactivating said driving means upon such detection.

11. A process for the dehydration of residues such as sludge or pulpy residues, said process comprising:
feeding residue to be dehydrated between first and second filter means each of which is mounted for movement about a respective endless path by supplying said residue to a horizontal run of said first filter means, and spreading said residue across the width of said first filter means;
driving said first and second filter means at the same speed while passing said first and second filter means with said residue therebetween alternately over portions of the peripheries of a plurality of cylindrical members, thereby pressing and dehydrating said residue;
simultaneously and uniformly tensioning said first and second filter means; and
detecting the termination of supply of residue to said horizontal run and stopping driving of said filter means upon such detection.

12. A process as claimed in claim 11, wherein an upstream-most of said cylindrical members, in the direction of dehydration of said residue, comprises a perforated drum, and further comprising pressing said filter means and said residue against said perforated drum at a uniform pressure regardless of the thickness of said residue between said first and second filter means.

13. A process as claimed in claim 11, wherein said step of uniformly tensioning comprises simultaneously tensioning both of said first and second filter means by means of separate fluid operated tensioning assemblies operatively connected to and simultaneously controlled by a single fluid source.

14. A process as claimed in claim 13, further comprising pressing said filter means and said residue against a first of said cylindrical members at a uniform pressure regardless of the thickness of said residue between said first and second filter means.

15. A process as claimed in claim 14, wherein said step of pressing at a uniform pressure comprises forcing pressing rollers against said filter means and said residue as a function of the tension exerted on said filter means by said tensioning assemblies.

16. A system for the dehydration of residues such as sludge or pulpy residues, said system comprising:
first and second filter means between which is fed a residue to be dehydrated, each said filter means being mounted for movement about a respective endless path;
a plurality of cylindrical members mounted to support both said first and second filter means over portions of the respective endless paths thereof;
said first and second filter means, with said residue therebetween, passing alternately over portions of the peripheries of said cylindrical members, thereby pressing and dehydrating said residue;
means for driving first and second adjacent of said cylindrical members at the same speed but in opposite directions, and for thereby driving said first and second filter means;
means for simultaneously and uniformly tensioning said first and second filter means;
said endless path of said first filter means including a substantially horizontal run onto which is supplied said residue; and
at least one roller means, hingedly mounted to press against said residue on said horizontal run by the weight of said roller means alone, for spreading said residue across the width of said horizontal run.

17. A system as claimed in claim 16, wherein said first and second filter means each comprise an endless porous filter belt.

18. A system as claimed in claim 16, wherein an upstream-most of said cylindrical members, in the direction of dehydration of said residue, comprises a perforated drum.

19. A system as claimed in claim 18, further comprising supplemental pressing means for pressing said filter means and said residue against said perforated drum at a uniform pressure regardless of the thickness of said residue between said first and second filter means.

20. A system as claimed in claim 16, wherein said tensioning means comprises a separate fluid operated tensioning assembly for each said filter means, and a single fluid source operatively connected to both said tensioning assemblies to simultaneously and equally control the operation thereof.

21. A system as claimed in claim 20, wherein each said tensioning assembly comprises a tensioning roller over which passes the respective filter means, a pair of articulated arms supporting opposite ends of said tensioning roller, and a pair of fluid operated piston-cylinder assemblies, one each connected to one of said arms, and both of said piston-cylinder assemblies of each of said tensioning assemblies being operatively connected to said single fluid source to be simultaneously operated thereby.

22. A system as claimed in claim 21, further comprising supplemental pressing means for pressing said filter means and said residue against a first of said cylindrical members at a uniform pressure regardless of the thickness of said residue between said first and second filter means.

23. A system as claimed in claim 22, wherein said supplemental pressing means comprises a plurality of pressing rollers supported by mounts about the periphery of said first cylindrical member, and fluid operated means for positioning said pressing rollers at a controlled position from said first cylindrical member.

24. A system as claimed in claim 23, wherein said fluid operated means are operated by said single fluid source such that said controlled position of said pressing rollers is variable as a function of the tension exerted on said filter means by said tensioning assemblies.

25. A system as claimed in claim 16, wherein said first and second adjacent cylindrical members are of equal diameter.

26. A system as claimed in claim 16, wherein said driving means comprises a drive motor, and first and second gear assemblies driven by said drive motor and respectively coupled to said first and second adjacent cylindrical members.

27. A system as claimed in claim 16, further comprising detection means, operatively connected to said roller means and said driving means, for detecting the termination of supply of residue to said horizontal run and for deactivating said driving means upon such detection.

* * * * *